United States Patent [19]
Morain et al.

[11] 3,934,849
[45] Jan. 27, 1976

[54] SEATING AND ACTUATOR FOR A BALL VALVE

[75] Inventors: Eldon W. Morain; Judson C. Cole, both of Tulsa, Okla.

[73] Assignee: Continental Industries, Inc., Tulsa, Okla.

[22] Filed: June 14, 1974

[21] Appl. No.: 479,283

[52] U.S. Cl. ............... 251/163; 251/259; 251/298
[51] Int. Cl.² ........................................ F16K 25/00
[58] Field of Search .......... 251/163, 259, 298, 175; 137/271, DIG. 2

[56] References Cited
UNITED STATES PATENTS

| | | |
|---|---|---|
| 2,499,732 | 3/1950 | Diehl ............................... 251/163 |
| 2,574,428 | 11/1951 | Wheatley ........................... 251/163 |
| 2,650,059 | 8/1953 | Hjulian ............................. 251/259 |
| 3,368,790 | 2/1968 | Burke ............................ 251/298 X |
| 3,473,554 | 10/1969 | King ............................. 251/163 X |

*Primary Examiner*—Harold W. Weakley
*Attorney, Agent, or Firm*—Head & Johnson

[57] ABSTRACT

Improvements in a ball-type shut off valve including a resilient seating means whereby an O-ring is included in conjunction with the seat to provide both metal-to-metal and metal-to-O-ring seating. Also included is a removable ball carrying means carried by the actuator arm, whereby straight through assembly of the actuator arm may be made directly through the valve operator opening thereby reducing the possibility of damaging seals on assembly and disassembly.

7 Claims, 5 Drawing Figures

SEATING AND ACTUATOR FOR A BALL VALVE

BACKGROUND OF THE INVENTION

1. Field of the Invention

This invention relates to improvements in a valve and more particularly, but not by way of limitation to a ball-type shut off valve having improved seating means and ball actuator means to insure more effective closure and provide a valve which is easily assembled and maintained.

2. Description of the Prior Art

The improvements specified herein relate to a ball-type valve of the type disclosed in the patent to Burke, U.S. Pat. No. 3,343,803 issued Sept. 26, 1967, entitled "Ball Valve With Improved Resilient Closing Means"; the patent to Burke, U.S. Pat. No. 3,467,355, issued Sept. 16, 1969, entitled "Ball Valve With Improved Resilient Closing Means", and applicant's copending Application Ser. No. 360,654, filed May 16, 1973 and entitled "Improved Ball Valve" and now abandoned.

The pivotally mounted actuator arm of the type disclosed in the above patent and patent application is generally provided with an outwardly extending cam surface for forcing the ball against the ball seat, the ball being guided toward the seat by a ball retaining pin. The actuator arm is also provided with a pair of elongated outwardly extending parallel fingers or ball carrying means for contacting and carrying the unseated ball out of the way of fluid passage through the valve. It is necessary in this type of valve that these fingers have an opening in the center in order to straddle the ball retaining pin when moving past the said pin. Due to the required length of the said fingers, it has heretofore proven difficult to install the actuator arm within the valve body.

Further, one of the primary advantages disclosed in the prior art patents is that of a resilient pivot pin connected to the actuator arm whereby the ball is resiliently urged toward the metal seat to prevent damage to the ball or the seat if too much force is applied on the ball against the seat. However, since the ball cannot be guided directly into the seat, even with this resilient pivot pin some damage and often excessive wear is induced by the ball impacting the rim of the seat before falling into place within the seat and being urged thereagainst with the actuator arm cam.

SUMMARY OF THE INVENTION

The present invention is particularly designed and constructed to provide a valve having all of the advantageous features enumerated in the aforementioned patents and patent application and including improved ball seating means and actuator means to overcome the disadvantages inherent in said prior art valves.

The improved seating means comprises an annular seating ring having an annular seating surface for receiving the ball thereagainst. This seating ring is provided with a specially designed O-ring groove around the outer periphery of the seating surface for receiving an O-ring therein. The valve ball then makes initial contact with the O-ring and then is pressed into sealing contact against the seating surface thereby cushioning the impact of the ball against the seating surface which prevents damage to both ball and surface and at the same time provides a double leak-proof seal.

The improvements in the actuator arm lies in providing said arm with a removable U-shaped ball carrying means which allows straight in assembly of the actuator arm through the operator shaft opening and into the valve body. The actuator arm is provided with a pair of spaced apertures therethrough for receiving the legs or the pair of parallel fingers of the U-shaped carrying means therethrough. The said fingers of the carrying means are constructed having a length less than the diameter of the valve operation port.

The fingers are then partially inserted into and through the spaced apertures in the actuator arm and then centered therein with respect to the axis of rotation of the said actuator arm. The actuator arm with carrying means is then inserted straight in through the operator port. A separate tool is then inserted through one of the ports in the valve and used to drive the cross piece of the U-shaped carrying means against the actuator arm shaft so that the legs or fingers thereof are fully extended into the interior of the valve body. The fingers are then in position to contact the ball and move it from its seated position and remove it from the path of fluid flow through the valves when the actuator arm is rotated to the open position.

DESCRIPTION OF THE DRAWINGS

Other and further advantageous features of the present invention will hereinafter more fully appear in connection with a detailed description of the drawings in which.

DETAILED DESCRIPTION OF THE PREFERRED EMBODIMENT

Figure 1:
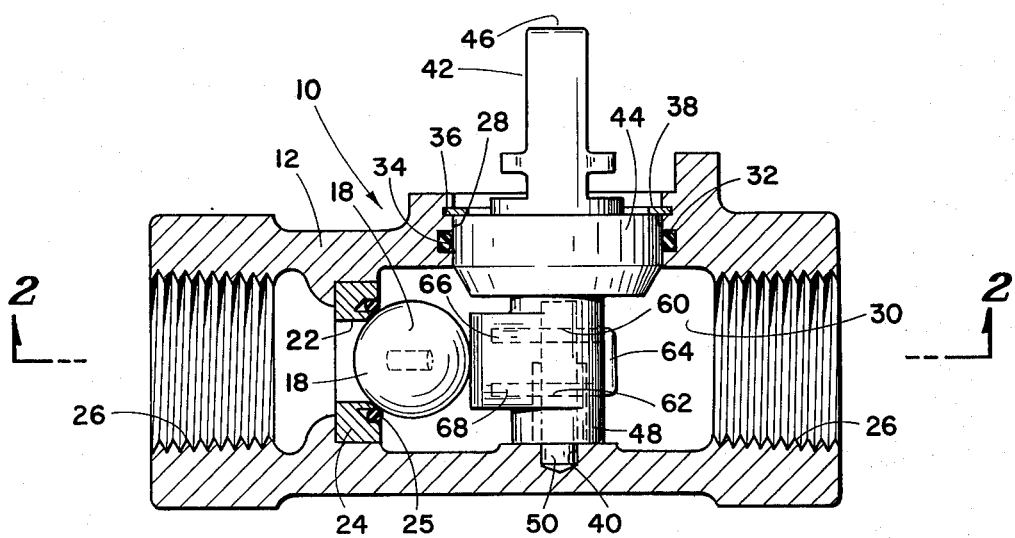
FIG. 1 is a partial sectional view of a ball-type valve embodying the present invention and showing the ball in a seated position.

Referring to the drawings in detail and particularly to FIG. 1, reference character 10 generally indicates in partial cross-section a ball type valve comprising a valve body 12 with pipe connection means at each end 26 forming a longitudinal flow channel through a circular opening 22 which is sealed by means of a metal ball or sphere 18. The seal is between a metal ring insert 24 having an O-ring 25 carried thereby and the ball 18 in a manner which will hereinafter be more fully set forth.

The valve body 12 is also provided with a circular actuator arm opening 28 which is traverse to the longitudinal flow channel and opens into an enlarged interior portion 30 of the valve body 12. The opening 28 is provided with a first annular groove 32 therearound for receiving a suitable O-ring 34 therein and a second annular groove 36 for receiving a split retainer ring 38 therein for a purpose that will be hereinafter set forth.

The interior of the valve body 12 is provided with a pivot post recess 40 which is diametrically opposite the opening 28 and in concentric alignment therewith. The valve 10 is provided with an actuator arm assembly generally indicated by reference character 42 and which comprises a cylindrical portion 44 which is journalled within the opening 28 of the valve body 12. The outer end of the cylindrical portion 44 is provided with an outwardly extending operator arm 46. The opposite end of the cylindrical member 44 is provided with a shaft portion 48 which is pivotally installed in the interior 30 of the valve 12. The inner end of the shaft portion 48 is provided with a resilient pivot pin 50 which extends into the recess 40 in a manner that is well known in the art. The actuator arm assembly is held in place within the valve body 12 by means of the split retainer ring 38 within the ring groove 36.

The shaft portion 48 is provided with an outwardly extending cam arm 52 having a cradle surface 54 on one side thereof with a cam surface 56 along the outer end thereof for engaging and seating the ball 18. The actuator arm means 48 is also provided with another similar outwardly extending arm 58 which is at approximately right angle to the cam arm 52. The second arm 58 is provided with a pair of spaced parallel transverse bores 60 and 62 therethrough, said bores being on an angle somewhat less than 90° with respect to the outwardly extending cam arm 52. A substantially U-shaped carrier means 64 having a pair of outwardly extending legs or fingers 66 and 68 are frictionally inertable within the bores 60 and 62, respectively.

The arm 58 is for the sole purpose of providing space for the aperture 60 and 62. However, the said arm is considered a part of the shaft 48 and by making the said shaft 48 a little larger than is shown, the bores 60 and 62 may be made therethrough.

The interior 30 of the valve body 12 is also provided with a ball retaining pin 70 which is inserted into a bore 72 adjacent to the ring insert 24. Said retaining pin 70 extends into the interior 30 of the valve body at a small angle with respect to the longitudinal flow axis therethrough. The pin is disposed in a position so that when the actuator arm means 48 is rotated the outwardly extending ball carrier fingers 66 and 68 will straddle the said retaining pin which allows passage thereof.

Figure 5:
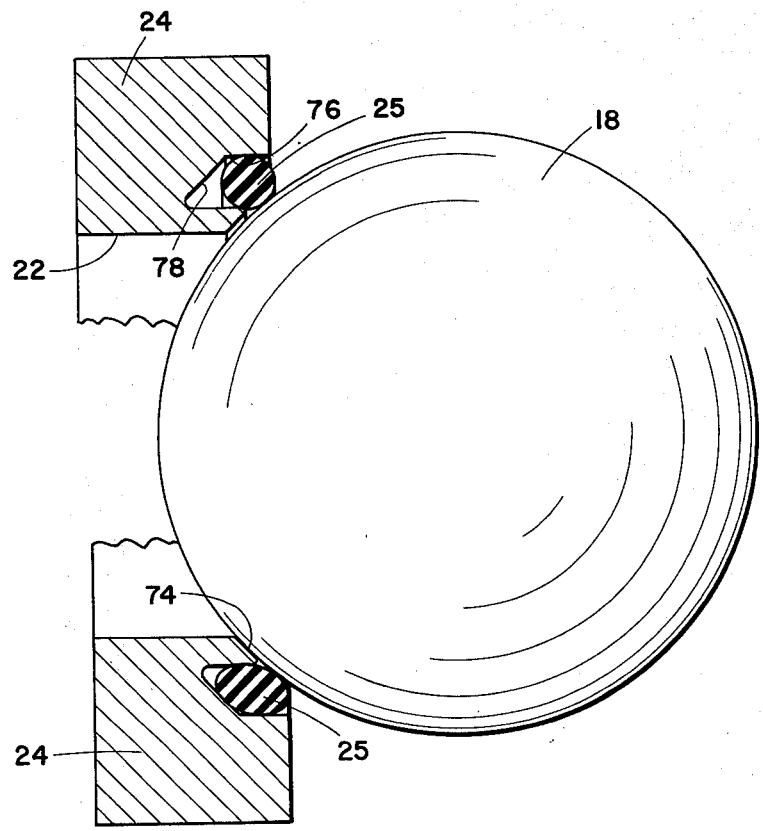
FIG. 5 is a partial sectional enlarged view of the valve seat broken to indicate the position of the ball upon contact with the seat O-ring and the position of the ball after seating against the seating surface.

Referring now to FIG. 5 the ring insert 24 is provided with an annular seating surface 74 around the interior thereof in the nature of an interior bevel and provided at a suitable angle to receive the surface of the sphere or ball 18 tangentially thereagainst. An annular groove 76 is provided in the ring insert 24 around the outer periphery of the seating surface 74, the said groove extending straight into the ring insert 24. The lower portion of the groove 76 is provided with a deeper angular groove 78 for a purpose which will be hereinafter set forth. The O-ring 25 is disposed within the groove 76 for contacting the ball 18.

Therefore, when the ball 18 encounters the seating means, it first encounters the O-ring 25 as depicted on the upper portion of FIG. 5 and is then forced into contact with the seating surface 74 thereby compressing the said O-ring 80 as shown in the lower portion of FIG. 5 into the groove extension 78. The O-ring provides a cushioning effect upon impact of the ball with the seating means and then provides a double seal of both metal-to-metal contact between the ball and the seating surface 74 and metal-to-O-ring contact adjacent thereto.

Figure 4:
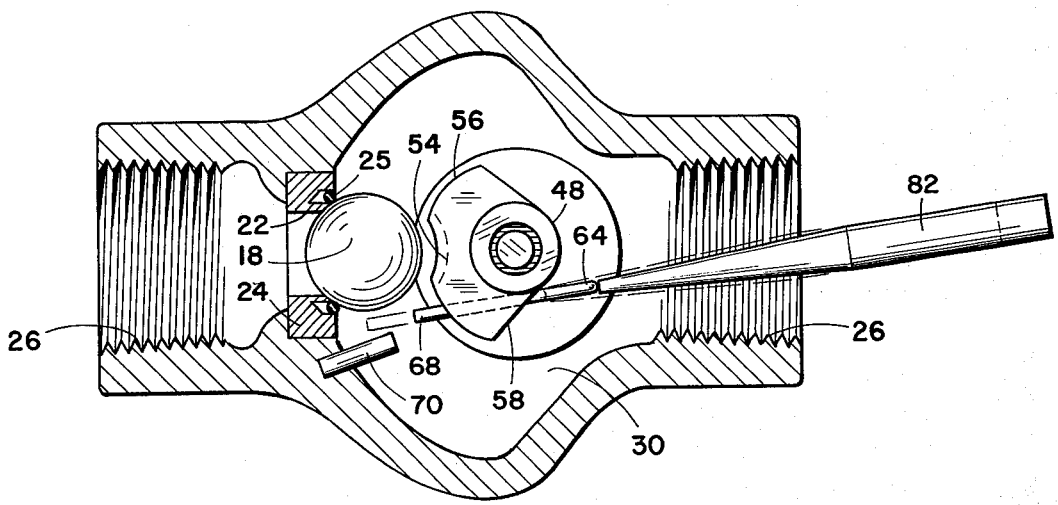
FIG. 4 is a partial sectional view depicting the use of an auxiliary tool for extending the ball carrying means after assembly of the valve.

The assembly of the valve as hereinbefore described is easily accomplished by first inserting the fingers 66 and 68 of the U-shaped carrier means into and through the bores 60 and 62 of the actuator arm means to a position as shown in FIG. 4 so that the ends of the U-shaped carrier means are disposed in alignment with and not protruding beyond the cylindrical portion 44 of the actuator arm assembly 42. The ball is first inserted into the valve body. The actuator arm assembly 42 may then be inserted straight into and through the opening 28 of the valve body with the pivot pin 60 being inserted into the bore 40 provided therefore. The retainer ring 38 is then installed within the groove 36 to hold the actuator arm assembly in place.

After the actuator arm assembly has been inserted and locked in place by the retainer ring the actuator arm is then rotated to a position as shown in FIG. 4 wherein the ball is unseated and resting between the seating means and the cradle surface 54 of the actuator arm. A suitable punch or special tool 82 may be then inserted through the port 26 into the interior 30 of the valve body 12 and in contact with the crossbar of the U-shaped carrier means 64. The said carrier means is then driven further through the bores 60 and 62 until the cross bar is resting against the arm 58 of the shaft 48 so that the fingers 66 and 68 are fully extended within the interior 30 of the valve body 12 as depicted by the dashed lines in FIG. 4.

Figure 2:
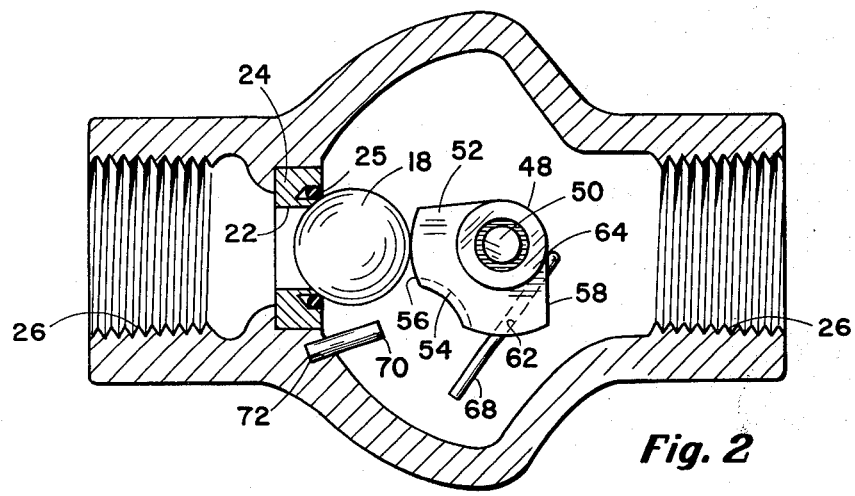
FIG. 2 is a partial sectional view taken along the broken lines 2—2 of FIG. 1.
Figure 3:
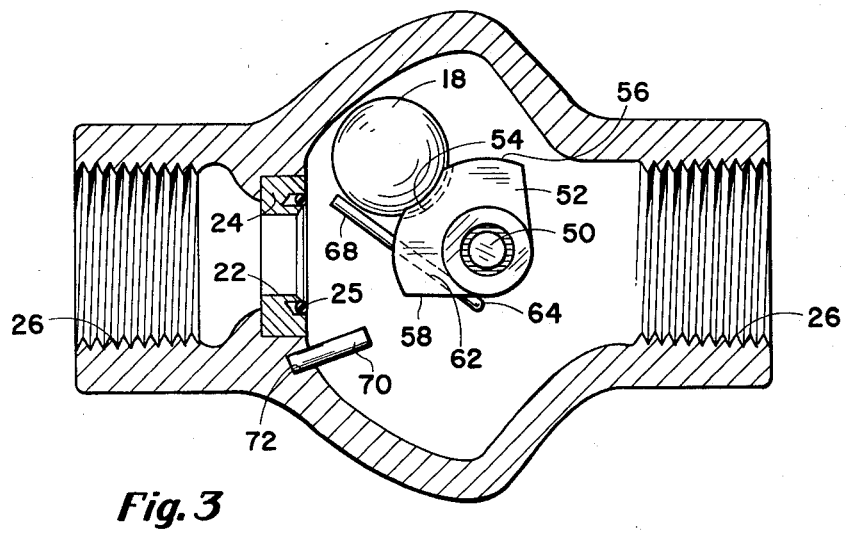
FIG. 3 depicts the valve as shown in FIG. 2 with the ball in the unseated position.

Disassembly of the valve is accomplished by rotating the actuator arm means to a position as shown in FIG. 4 and using a hook or other tool (not shown) for pulling the carrier means 64 back to the position as shown in the solid lines in FIG. 4. The retainer ring 38 may then be released and the actuator arm assembly pulled directly out of the valve body.

Where the valve is in a open position as depicted in FIG. 3 ball 18 may rest in the area adjacent to the cradle surface 54 between the actuator arm 52 and the fingers 66 and 68 of the carrier means. By rotating the shaft 48 in a clockwise direction as shown in FIG. 3 the ball 18 may be moved out of the way to substantially prevent interference with the flow of fluid through the interior 30 of the valve body 12. In order to seat the valve the actuator arm assembly 42 is rotated in a counterclockwise direction as shown in FIG. 2 and 3 and the ball is carried around to the vicinity of the valve seat assembly or ring insert 24. As the actuator arm continues to be pivoted in the counterclockwise direction the ball is prevented from passing the seat by encountering the retainer pin 70 and is deflected thereby toward the valve seat. The surface of the ball 18 then rolls up the inclined cradle surface 54 of the actuator arm means until it is encountered by the cam surface 56 of the cam arm. Further rotation then tightly presses the ball against the seat thereby deflecting the O-ring and allowing metal-to-metal contact between the ball 18 and the seating surface 74 of the ring insert 24. The tightness of the seat between the ball 18 and the ring insert 24 is determined by the amount of pressure applied by the cam surface 56 of the actuator arm means 48. This pressure is likewise cushioned by the resilient pivot pin 50 of the actuator arm means 48 as hereinbefore described.

From the foregoing, it is apparent that the present invention provides an improved seating means and improved actuator means for a ball-type valve.

Whereas, the present invention has been described in particular relation to the drawings attached hereto it is apparent that other and further modifications apart from those shown or sugested herein may be made within the spirit and scope of this invention.

What is claimed is:

1. A valve comprising:
    a valve body having a flow passageway therethrough;

an annular valve seat interposed in said passageway and having an aperture therethrough which defines a portion of said fluid passageway;

an operator shaft opening in one side of the valve body;

a ball in said passageway adaptable to close the valve when moved against the valve seat;

actuating arm means sealably journalled through said shaft opening and having a shaft portion disposed interior of the valve body, the actuating arm having a pair of spaced transverse apertures therein internally of said valve body;

a cam arm carried by the said shaft and extending outwardly therefrom for engaging and moving said ball toward the valve seat;

a retaining pin secured to the interior of the valve body adjacent to the valve seat for encountering and deflecting the said ball toward the valve seat;

a cam surface provided on said cam arm for forcing said ball against the valve seat when the actuating arm means is pivoted to a valve-closed position; and a U-shaped bar having parallel finger portions received in said pair of apertures in said actuating arm, the finger being angularly spaced from the cam arm, said fingers being adaptable for engaging the ball and moving said ball out of contact with the valve seat and carrying said ball out of the direct flow path when the actuator arm is pivoted to the valve-open position.

2. A valve as set forth in claim 1 wherein the overall length of the parallel members is less than the diameter of the operator shaft opening.

3. A valve as set forth in claim 1 wherein the valve seat comprises an annular ring insert secured within the valve body, the aperture therethrough defining a portion of the flow passageway, annular seating surface provided around the inside edge of the insert adjacent to the aperture therethrough and for receiving the ball thereagainst, cushioning means carried by the insert for cushioning the impact of the ball against the seating surface.

4. A valve as set forth in claim 3 wherein the seating surface constitutes a bevel provided on the inside edge of the insert in communication with the aperture therethrough.

5. A valve as set forth in claim 4 wherein the bevel is disposed at an angle with relation to the outer configuration of the ball so that the seating surface is tangential to the surface of the ball when the ball is seated thereagainst.

6. A valve as set forth in claim 3 wherein the cushioning means comprises annular groove around the face of the insert adjacent to the seating surface and having an O-ring disposed within said groove, said O-ring being adaptable for engaging the ball before the ball engages the seating surface.

7. A valve as set forth in claim 6 wherein the walls of the annular groove are concentric with the valve seat aperture.

* * * * *